(12) United States Patent
Liu

(10) Patent No.: US 7,540,675 B2
(45) Date of Patent: Jun. 2, 2009

(54) FOLDABLE KEYBOARD

(75) Inventor: Chia-Hung Liu, Jhongli (TW)

(73) Assignee: Darfon Electronics Corporation, Taoyuan (TW)

( * ) Notice: Subject to any disclaimer, the term of this patent is extended or adjusted under 35 U.S.C. 154(b) by 295 days.

(21) Appl. No.: 11/480,414

(22) Filed: Jul. 5, 2006

(65) Prior Publication Data

US 2007/0008291 A1    Jan. 11, 2007

(30) Foreign Application Priority Data

Jul. 5, 2005    (TW) ............... 94122670 A

(51) Int. Cl.
*B41J 5/08*    (2006.01)

(52) U.S. Cl. .................................. 400/472

(58) Field of Classification Search ............ None
See application file for complete search history.

(56) References Cited

U.S. PATENT DOCUMENTS

| | | | | |
|---|---|---|---|---|
| 5,198,991 A | * | 3/1993 | Pollitt | 400/472 |
| 5,941,648 A | * | 8/1999 | Robinson et al. | 400/82 |
| 6,614,649 B1 | * | 9/2003 | Wang | 400/82 |
| 6,679,639 B2 | * | 1/2004 | Katz | 400/472 |
| 6,785,126 B2 | * | 8/2004 | Hazzard et al. | 361/680 |
| 2004/0075588 A1 | * | 4/2004 | Wang et al. | 400/472 |

* cited by examiner

*Primary Examiner*—Jill E. Culler
(74) *Attorney, Agent, or Firm*—Reed Smith LLP; Juan Carlos A. Marquez, Esq.

(57) ABSTRACT

A foldable keyboard for inputting data into a portable electronic device is provided. The foldable keyboard includes an upper cover, a lower cover, a first keyboard portion, and a second keyboard portion. A space is formed, as the upper and the lower cover are in closed relationship to each other, for accommodating the first and second keyboard portions. As the upper and lower covers are opened from the closed relationship and the second keyboard portion, relative to the first keyboard portion, is rotated pivotally, said first and second keyboard portions are allowed to be substantially on a common plane.

10 Claims, 6 Drawing Sheets

FOLDABLE KEYBOARD

CROSS REFERENCE TO RELATED APPLICATIONS

This application claims priority to Taiwan Patent Application No. 94122670 entitled "Foldable Keyboard", filed on Jul. 5, 2005, which is incorporated herein by reference and assigned to the assignee herein.

FIELD OF INVENTION

The present invention generally relates to a foldable keyboard, and more particularly, to a foldable keyboard for inputting data into a portable electronic device.

BACKGROUND OF THE INVENTION

Portable electronic devices like Personal Digital Assistants (PDAs) are broadly used in recent years. Considering the carrying convenience, most portable electronic devices are not equipped with inputting keyboards. Even if an inputting keyboard is provided, the dimension of the inputting keyboard is relatively small. Thus, the inputting function of the inputting keyboard is neither satisfying nor ergonomic.

Foldable keyboards have been existing for external keyboards of portable electronic devices. However, drawbacks such as easy collision between keys, interference of the position of the hinge on inputting function and appearance of the keyboard, insufficient protection of the housing of the keyboard, and unstable supporting unit for seating the electronic device are often typical with prior art foldable keyboards.

Therefore, there is a need to provide an effective solution to overcome the shortcomings of the prior art mentioned above.

SUMMARY OF THE INVENTION

In accordance with one embodiment of the present invention, a foldable keyboard for inputting data into a portable electronic device includes an upper cover, a lower cover, a first keyboard portion, and a second keyboard portion. Wherein, a space is formed, as the upper and the lower covers are in closed relationship to each other, for accommodating the first and second keyboard portions. As the upper and lower covers are opened from the closed relationship and the second keyboard portion, relative to the first keyboard portion, is rotated pivotally, the first and second keyboard portions are allowed to be substantially on a common plane.

DETAILED DESCRIPTION OF THE INVENTION

Figure 1:
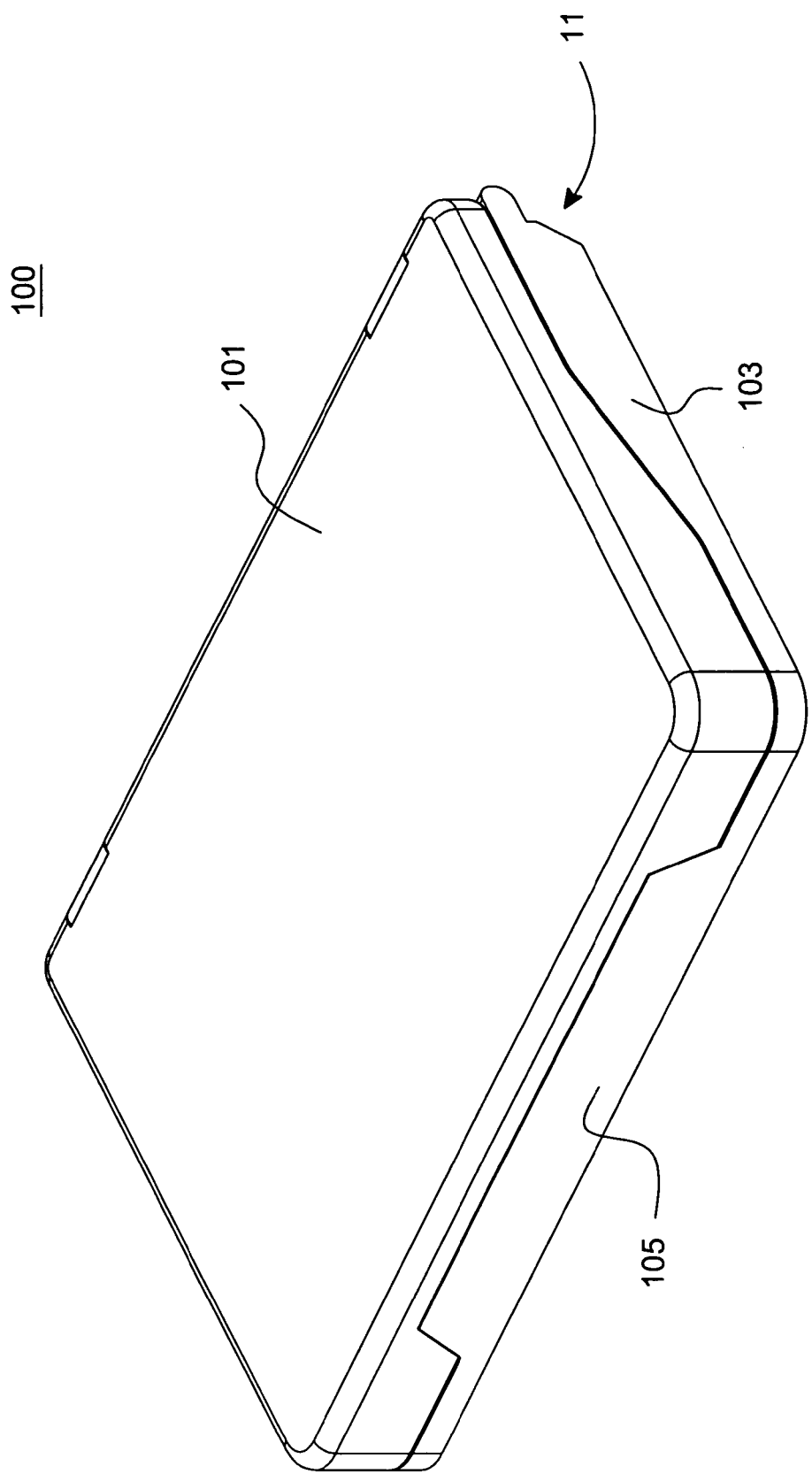
FIG. 1 is a schematic diagram illustrating a closed status of an embodiment of the present invention.

As shown in FIG. 1, a foldable keyboard 100 at a closed status includes an upper cover 101 and a lower cover 103. A space is formed, as the upper cover 101 and the lower cover 103 are in closed relationship to each other, for accommodating a first keyboard portion and a second keyboard portion (referring to FIG. 2) (i.e. the space surrounded by the upper cover 101 and the lower cover 103 in FIG. 1). The lower cover 103 includes a lock 105 for fixing the upper cover 101 to the lower cover 103. For example, referring to FIG. 2, the lock 105 is a hook. In other embodiments, the lock 105 can be any object that fixes the upper cover 101 to the lower cover 103. The lock 105 can also be mounted on the upper cover 101. The lower cover 103 includes an inclined plane 11 for maintaining a predetermined angle (i.e. angle θ in FIG. 4) between the upper cover 101 and the cover 103 as the upper cover 101 is in touch with the inclined plane 11. The upper cover 101 and the lower cover 103 are capable of providing the most protection to avoid the first keyboard portion 201 and the second keyboard portion being damaged from collision and wear. In addition, the rectangular covers are artistic and convenient for stock.

Figure 2:
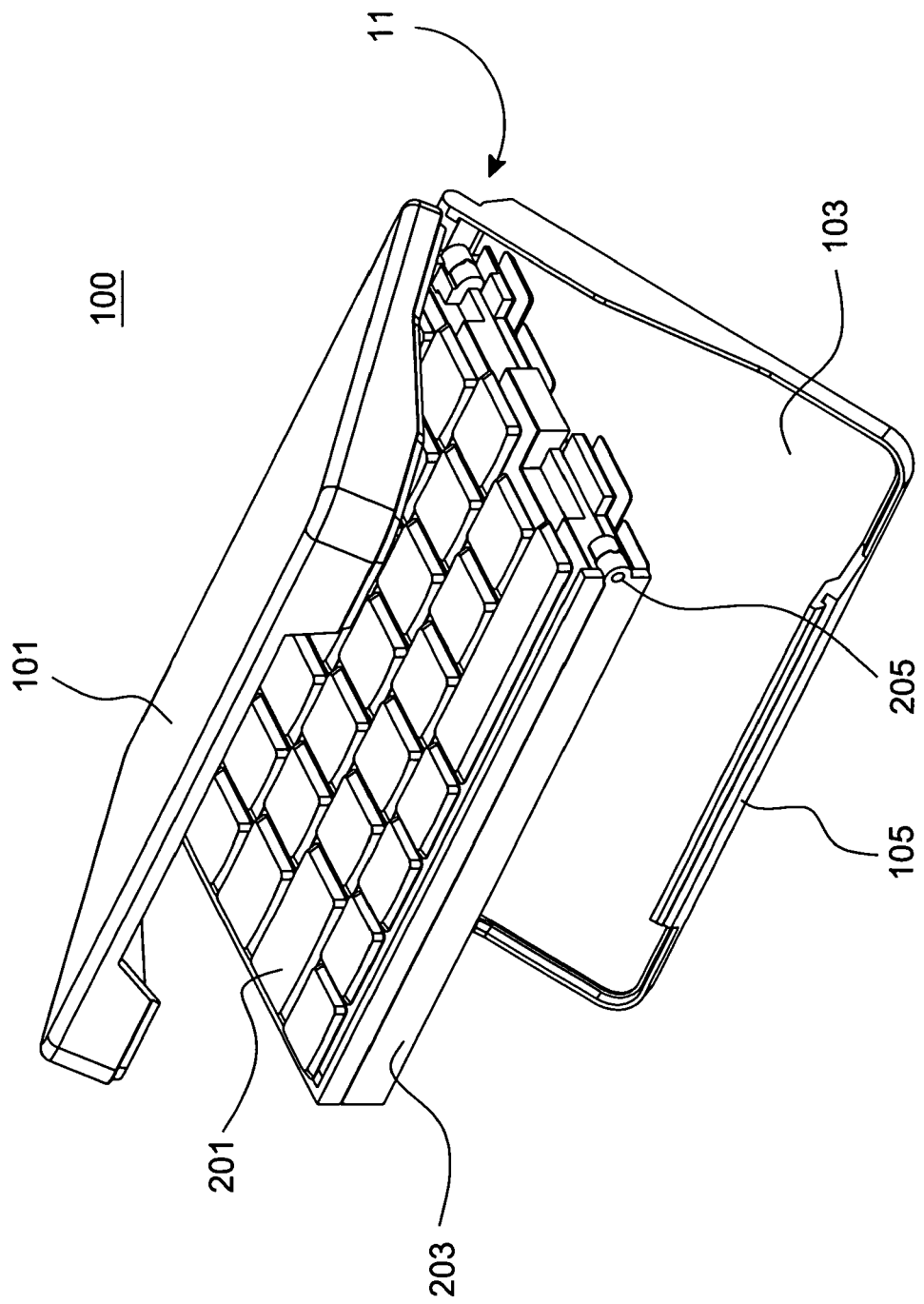
FIG. 2 is a schematic diagram showing an opening process of an embodiment of the present invention.

FIGS. 2 to 5 illustrate the foldable keyboard 100, describing from its closed status to its opening process orderly, in accordance with an embodiment of the present invention. Referring to FIG. 2, when a user wants to use the foldable keyboard, he can unfold the upper cover 101 and the lower cover 103. As shown in FIG. 2, the first keyboard portion 201 is above the second keyboard portion 203, therefore keys on the first keyboard portion 201 and keys on the second keyboard portion 203 do not contact each other such that reducing the possibility of failures resulted from abrasion. Moreover, a hinge 205 is disposed at a position for pivotally rotating the first keyboard portion 201 and the second keyboard portion 203. When the foldable keyboard 100 is in use, the hinge 205 will not affect an input action of the user (referring to FIG. 5 and FIG. 6). More detailed descriptions will be given in the following.

Figure 3:
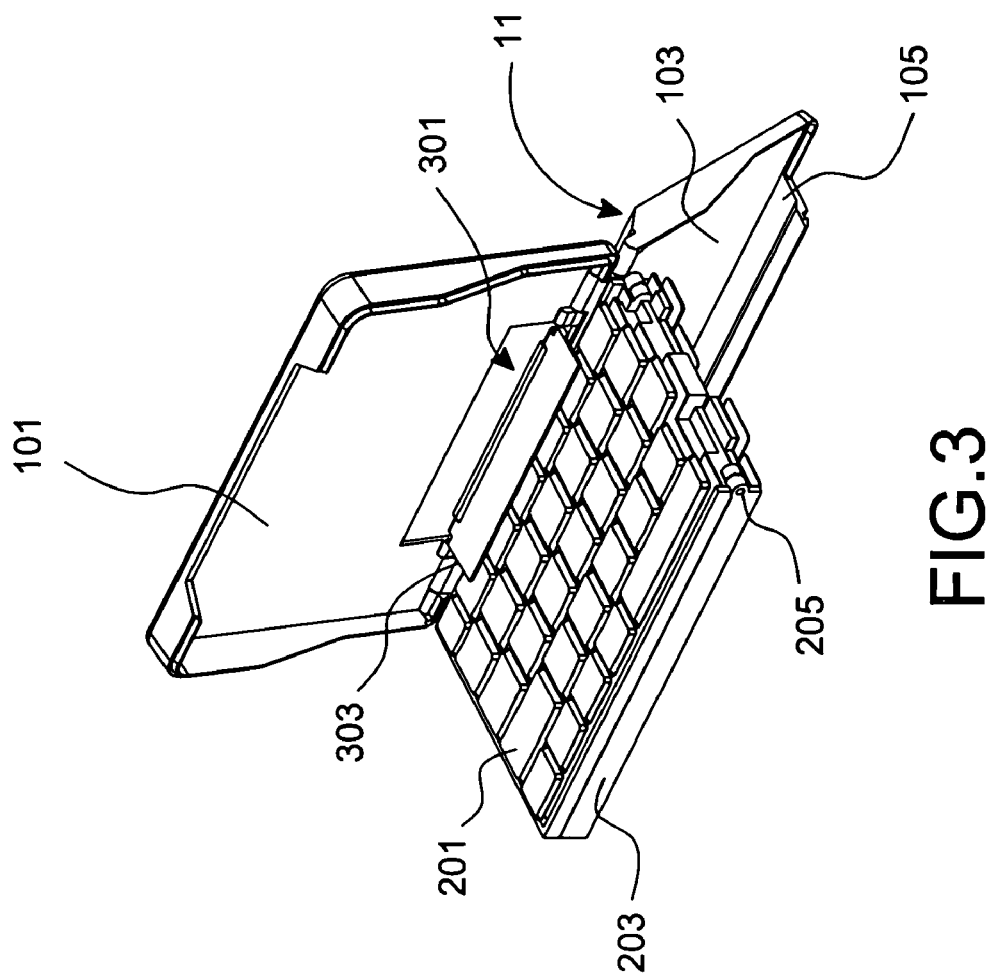
FIG. 3 is a schematic diagram showing an opening process of an embodiment of the present invention.

Referring to FIG. 3, the foldable keyboard 100 includes a support unit 303 for supporting the portable electronic device used accompanied. In the present embodiment, the supporting unit 303 can be used as a part of the upper cover 101. While the supporting unit 303 is at rest, it can be stored in an accommodating space 301 of the upper cover 101 without affecting the normal operation of the keyboard. In other embodiments, the supporting unit 303 can be a strut, an elastic fragment or other fittings with similar functions. In other embodiments, the accommodating space 301 may not be disposed on the upper cover 101 (i.e. the upper cover 101 needs not to define the accommodating space 301 for accommodating the supporting unit 303), provided that the operation of the foldable keyboard 100 is not affected.

Figure 4:
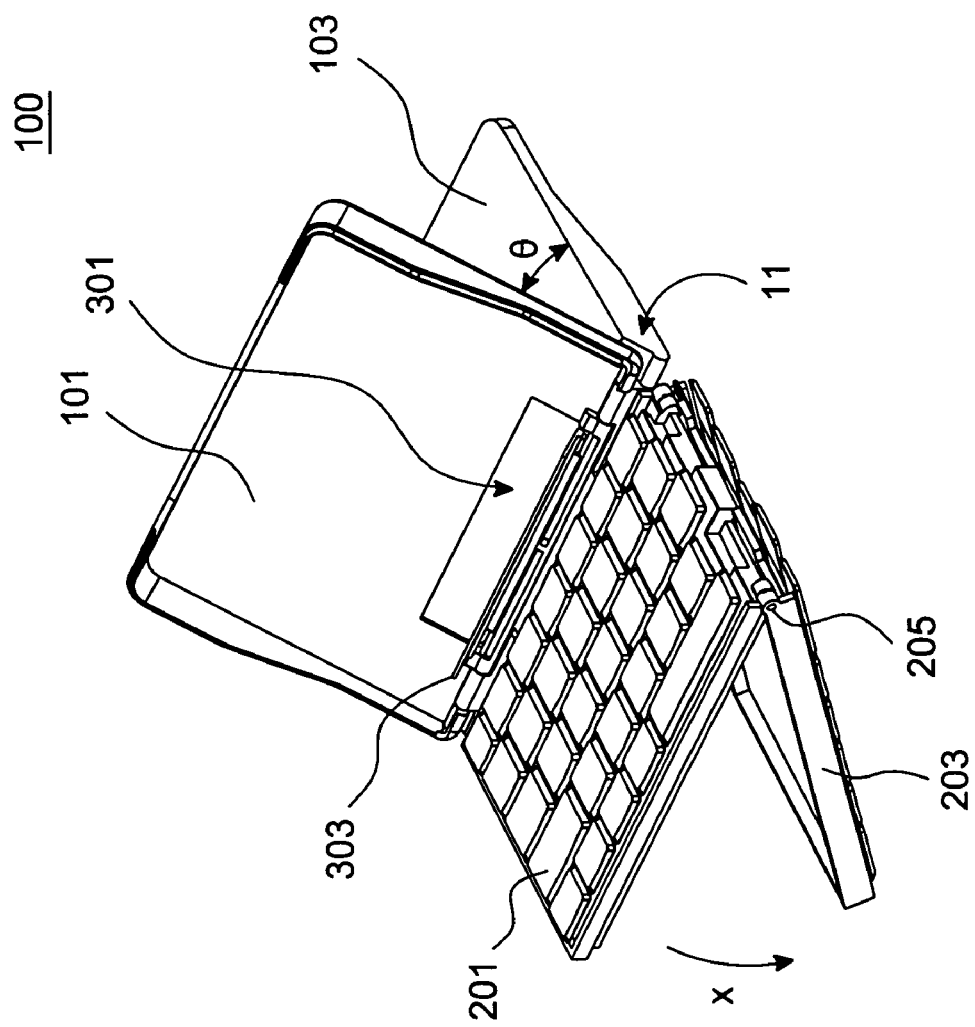
FIG. 4 is a schematic diagram showing an opening process of an embodiment of the present invention.
Figure 5:
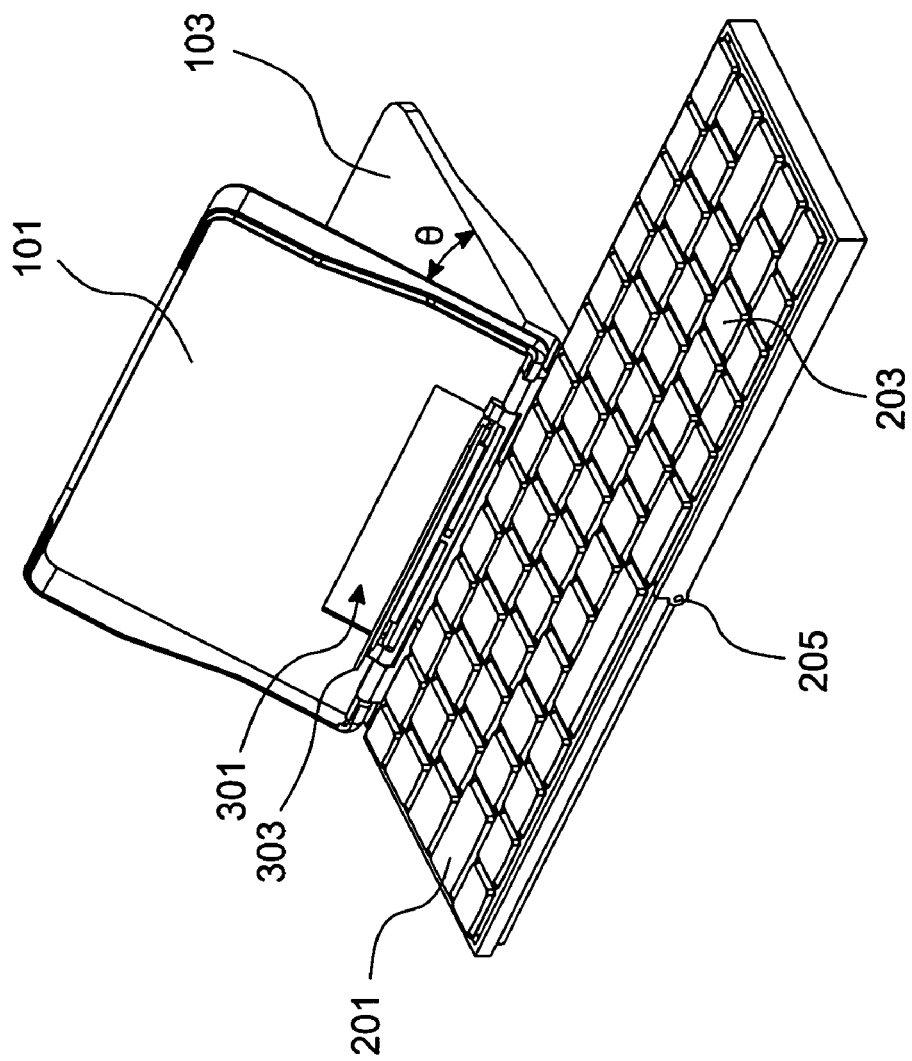
FIG. 5 is a schematic diagram showing an opening process of an embodiment of the present invention.

Referring to FIG. 3, FIG. 4, and FIG. 5, when the user unfold the upper cover 101 and the lower cover 103, he can pivotally rotate the lower cover 103, relative to the upper cover 101, to the back of the keyboard (FIG. 3). Finally, the upper cover 101 gets in touch with the inclined plane 11 of the lower cover 103 to maintain the predetermined angle θ (FIG. 4) between the upper cover 101 and the lower cover 103. For example, angle θ is 45 degrees. However, the degree of θ may vary depending on different user behaviors. When the user adjusts the upper cover 101 and the lower cover 103, he can also adjust the second keyboard portion 203 in the meanwhile by using the hinge 205 as an axis and pivotally rotating the second keyboard portion 203 (such as the X direction shown in FIG. 4), relative to the first keyboard portion 201, until the first keyboard portion 201 and the second keyboard portion 203 are substantially on a common plane (FIG. 5). As shown in FIG. 5, the hinge 205 is at the reverse side of the keys of the keyboard. Thus, the hinge 205 does not affect the input action of the user.

Figure 6:
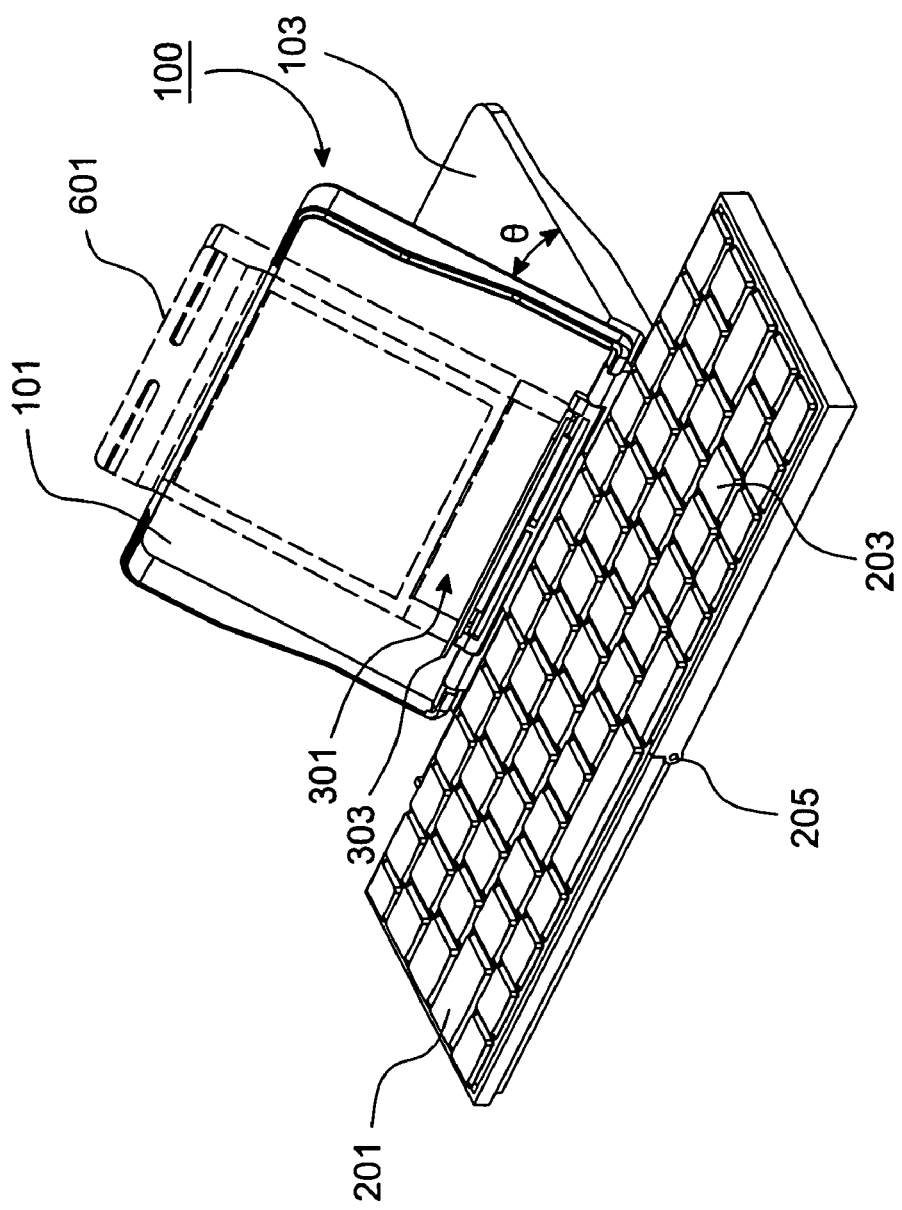
FIG. 6 is a schematic diagram illustrating an embodiment of the present invention in use status.

Last, referring to FIG. 6, the user can rotate the upper cover 101 to the center of the first keyboard portion 201 and the second keyboard portion 203. Thereafter, he can place a portable electronic device 601 used accompanied on the support unit 303. Data transmission between the portable electronic device 601 and the foldable keyboard 100 can be a mode of wireless communication such as Bluetooth Protocol, infrared signal, or the like.

The illustration of the embodiment of the present invention is given above for the better understanding of the characteristics and spirit of the present invention. It will be understood that the invention is not limited to the particular embodiment described herein, but is capable of various modifications and rearrangements without departing from the scope of the invention. Therefore, it is intended that the following claims, accompanied by detailed descriptions giving the broadest explanation, not only define the scope of the present invention but also cover all such modifications and changes as fall within the true spirit and scope of the present invention.

What is claimed is:

1. A foldable keyboard for inputting data into a portable electronic device, comprising:
   an upper cover for supporting said portable electronic device;
   a lower cover pivotally connected to said upper cover and comprising an inclined plane for facilitating in maintaining a predetermined angle between said upper cover and said lower cover as said upper cover is in touch with said inclined plane;
   a first keyboard portion slidably connected with said upper cover and said lower cover; and
   a second keyboard portion pivotally connected to said first keyboard portion,
   wherein, a space is formed, as said upper cover and said lower cover are in a closed relationship to each other, for accommodating said first and second keyboard portions, and as said upper and lower covers are opened from the closed relationship and said second keyboard portion, relative to said first keyboard portion, is rotated pivotally, said first and second keyboard portions are allowed to be substantially on a common plane.

2. The foldable keyboard of claim 1, further comprising a wireless communication module for transmitting said data to said portable electronic device.

3. The foldable keyboard of claim 2, wherein said foldable keyboard and said portable electronic device communicate with each other through Bluetooth Protocol.

4. The foldable keyboard of claim 2, wherein said foldable keyboard and said portable electronic device communicate with each other through infrared signal.

5. The foldable keyboard of claim 1, wherein said lower cover further comprises a lock for fixing closed said upper cover to said lower cover in the closed relationship.

6. The foldable keyboard of claim 1, wherein said upper cover further comprises a lock for fixing said upper cover to said lower cover in the closed relationship.

7. The foldable keyboard of claim 1, further comprising a supporting unit attached on said upper cover for supporting said portable electronic device.

8. The foldable keyboard of claim 7, wherein said supporting unit is an adjustable baffle plate.

9. The foldable keyboard of claim 7, wherein said upper cover defines a space for accommodating said support unit.

10. The foldable keyboard of claim 1, wherein said first keyboard portion and said second keyboard portion are pivotally connected by a hinge, and said hinge is disposed on a side of said keyboard portion not having keys.

* * * * *